United States Patent [19]

Dellinger

[11] Patent Number: 5,006,635

[45] Date of Patent: Apr. 9, 1991

[54] MOLECULAR WEIGHT CONTROLLER COMPOSITION FOR AQUEOUS POLYMERIZATION OF LACTAM TO POLYAMIDE

[75] Inventor: Jack A. Dellinger, Weaverville, N.C.

[73] Assignee: BASF Corporation, Williamsburg, Va.

[21] Appl. No.: 359,445

[22] Filed: May 31, 1989

Related U.S. Application Data

[62] Division of Ser. No. 294,959, Jan. 6, 1989, Pat. No. 4,844,834.

[51] Int. Cl.$^5$ .............................................. C08G 69/16
[52] U.S. Cl. ..................................... 528/315; 528/312; 528/313; 528/318; 528/323
[58] Field of Search ............... 528/315, 312, 313, 318, 528/323

[56] References Cited

U.S. PATENT DOCUMENTS

| | | | |
|---|---|---|---|
| 2,174,527 | 10/1939 | Peterson | 260/78 |
| 3,037,002 | 5/1962 | Pietrusza et al. | 260/78 |
| 3,558,567 | 1/1971 | Twilley et al. | 260/78 |
| 3,578,640 | 5/1971 | Twilley et al. | 260/78 |
| 3,579,483 | 5/1971 | Twilley et al. | 260/78 |
| 3,595,935 | 7/1971 | Crescentini | 260/857 |
| 3,632,558 | 1/1972 | Siclari et al. | 260/78 |
| 3,635,911 | 1/1972 | Weedon et al. | 260/78 |
| 4,075,271 | 2/1978 | Lofquist et al. | 264/210 |
| 4,188,478 | 2/1980 | Goebel | 528/314 |
| 4,398,012 | 8/1983 | Merrill et al. | 528/84 |
| 4,574,054 | 3/1986 | Ciaperoni et al. | 528/315 |
| 4,684,713 | 8/1987 | Kohyama et al. | 528/315 |
| 4,746,724 | 5/1988 | Nap et al. | 528/318 |
| 4,844,834 | 7/1989 | Dellinger | 528/323 |

Primary Examiner—Harold D. Anderson
Attorney, Agent, or Firm—Karen M. Dellerman; Edward F. Sherer

[57] ABSTRACT

A molecular weight controller having particular application in the polymerization of a lactam, i.e., epsiloncaprolactam, to a polyamide, i.e., poly(epsiloncaprolactam). The molecular weight controller comprises a primary monofunctional amine, i.e., benzylamine, a primary monofunctional acid, i.e., acetic acid, and a salified aminoacid containing an aromatic, a cyclohexane, or cyclopentane moiety, i.e., 4-(aminomethyl)benzoic acid salified with p-toluenesulfonic acid. The resulting polyamide has a reduced water extractable content.

15 Claims, No Drawings

MOLECULAR WEIGHT CONTROLLER COMPOSITION FOR AQUEOUS POLYMERIZATION OF LACTAM TO POLYAMIDE

This is a divisional of co-pending application Ser. No. 07/294,959 filed on Jan. 6, 1989, now U.S. Pat. No. 4,844,834.

BACKGROUND OF THE INVENTION

1. Field of the Invention

This invention relates to molecular weight controllers useful in the polymerization of lactams to polyamides, which find particular application in the melt-spinning of filamentary structures.

2. Description of the Prior Art

Fibers comprised of polyamides, especially poly(epsiloncaprolactam), otherwise known as nylon 6, find widespread commercial use in view of their highly desirable physical, chemical, and aesthetic qualities.

The term "fiber" as used herein includes fibers of extreme or indefinite length (i.e., filaments) and fibers of short length (i.e., staple). The term "yarn" as used herein means a continuous strand of fibers.

Fibers of polyamides, including those of nylon 6, are usually prepared by the melt extrusion of molten polyamide through spinnerette plates containing small-dimensioned orifices. A common procedure for producing the polyamides and, in particular, nylon 6, involves the polymerization of epsiloncaprolactam at sufficient temperatures and in the presence of water which serves to initiate the polymerization. Polymers prepared in this manner, however, usually contain more than 10 percent water extractable material which usually comprises caprolactam monomers and linear and cyclic oligomers. The oligomers are mainly low molecular weight cyclic condensation products of epsiloncaprolactam. The presence of such water extractable material has an adverse effect on the performance of the polymer in the extrusion shaping of fibers and even larger-dimensioned articles such as pipes. To produce fibers having satisfactory physical properties, the water extractable content, which consists of oligomers and monomers (epsiloncaprolactam), should be less than 2.5 percent by weight of the polymer. The monomer content should be less than 0.5 percent by weight of the polymer.

Various procedures have been utilized to remove water extractable materials from polyamides prior to their melt spinning. The most common approach involves the hot water leaching of the nylon 6 in granular form to remove water extractable material, followed by thorough drying prior to its melt extrusion. Another technique employed has been to subject molten nylon 6, generally in the form of thin films or shallow layers, to an extremely high vacuum, which removes the relatively volatile epsiloncaprolactam monomer but has only a minor effect on the less volatile oligomer materials. Such purification techniques involve additional processing steps with an attendant increased manufacturing cost. In addition, regardless of the purification technique applied to the nylon 6, once the reaction mass is no longer under the influence of vacuum, the monomer can reform at high temperature within the polymer prior to spinning.

In order to reduce the extra manufacturing costs involving purifying polyamides, i.e., poly(epsiloncaprolactam), various procedures have been proposed for the continuous production of caprolactam having a reduced amount of water extractable material. Such procedures include, for example, the addition to the polymerization reaction of an organic acid material, or an organic basic material or combinations thereof as molecular weight controllers or chain terminators.

As described in U.S. Pat. No. 4,574,054, which is hereby incorporated by reference, in order to lower the formation rate of water extractable materials, it is necessary to synthesize polyamides having a low content of terminal amino groups. However, polymerization kinetics require a certain amount of terminal groups (both amino and carboxylic) and terminal amino groups are necessary in order to provide the polyamides with an affinity for anionic dyestuffs.

The present invention provides a molecular weight controller for polymerizing lactams to polyamides which overcomes or at least mitigates the above-described problems.

SUMMARY OF THE INVENTION

The surprising discovery has now been made that a polyamide having a low content of water extractables and a affinity for anionic dyestuffs can be prepared using a molecular weight controller comprising a monofunctional primary amine, a monofunctional organic acid, and an aminoacid containing a cyclic structure of 5 or 6 carbon atoms and having its amino groups salified by an acid.

The polyamides and, in particular, nylon 6, prepared utilizing the molecular weight controllers of the present invention have a terminal amino-group content in the range of from about 22 to 42 equiv/$10^6$g and a terminal carboxylic group content in the range of from about 10 to 15 equiv/$10^6$ g. Generally, the water extractable content is less than 0.7% by weight of polyamide, including a monomer content of less than 0.25% and an oligomer content of less than 2.0%. Thus, a commercial polyamide is produced having excellent affinity with anionic dyestuffs. The polyamides find particular use as yarns in textile applications.

The precise manner in which the molecular weight controllers function to produce the polyamide having the desired properties is not fully understood and need not be. Although the invention is not intended to be limited to any particular theory of operation, it is believed that the cyclic structure contained in the salified aminoacid, due to its rigidity, is especially effective in preventing the formation of undesirable cyclic oligomers in addition to preventing the formation of linear oligomers and monomers. Regardless of the theory proposed, it is sufficient to point out that the molecular weight controllers operate successfully in the manner disclosed herein.

DESCRIPTION OF THE PREFERRED EMBODIMENTS

The molecular weight controllers of the present invention comprise the following ingredients:

(1) a monofunctional primary amine having a boiling point of at least 180° C. at atmospheric pressure and a basic dissociation constant of at least $1.7 \times 10^{-5}$;

(2) a monofunctional organic acid having an acid dissociation constant of at least $1.5 \times 10^{-5}$; and, (3) an aminoacid containing a cyclic structure of 5 or 6 carbon atoms, having a total number of carbon atoms in the range of from about 6 to 9 carbon atoms, and having its amino group salified by a mono-functional acid having an acid dissociation constant of at least $1.0 \times 10^{-2}$.

Examples of preferred monofunctional primary amines include primary aliphatic amines such as nonylamine, decylamine, and dodecylamine, and primary aromatic amines and derivatives of said amines which are substituted in the ring, such as benzylamine, α-phenylethylamine, and β-phenylethylamine, and mixtures thereof.

Examples of preferred monofunctional organic acids include monofunctional aliphatic carboxylic acids containing at least 2 carbon atoms, such as acetic acid, propionic acid, n-butyric acid, isobutyric acid, n-valeric acid, trimethylacetic acid, caproic acid, and pelargonic acid, and monofunctional aromatic acids such as benzoic acid and napthionic acid, and mixtures thereof.

Examples of aminoacids corresponding to ingredient (3) include aminoacids containing an aromatic, cyclohexane, or cyclopentane moiety. Examples of preferred aminoacids include aminocyclohexanecarboxylic acids such as compounds represented by the following formula:

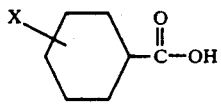

I wherein:
X is $H_2N-$ or $NH_2R^1-$, $R^1$ is methylene or ethylene, and X occupies one of the two 3 positions or the 4 position with respect to the carboxylic acid moiety.

Examples of compounds corresponding to formula I include trans-1,4-aminocyclohexanecarboxylic acid, cis-1,4-aminocyclohexanecarboxylic acid, trans-1,3-aminocyclohexanecarboxylic acid, cis-1,3-aminocyclohexanecarboxylic acid, cis-1(aminomethyl)-3-cyclohexanecarboxylic acid, trans-1(aminomethyl)-3-cyclohexanecarboxylic acid, cis-1(aminoethyl)-3-cyclohexanecarboxylic acid, trans-1(aminoethyl-3-cyclohexanecarboxylic acid, cis-1(aminomethyl)-4-cyclohexanecarboxylic acid, trans-1(aminomethyl)-4-cyclohexanecarboxylic acid, cis-1(aminoethyl)-4-cyclohexane-carboxylic acid, trans-1(aminoethyl)-4-cyclohexanecarboxylic acid, and mixtures thereof.

Another example of preferred aminoacids comprises aminobenzoic acids represented by the following formula:

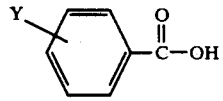

II wherein:
Y is $H_2N-$ or $NH_2R^2-$, $R^2$ is methylene or ethylene and Y occupies the para position or one of the two meta positions with respect to the carboxylic acid moiety.

Examples of compounds corresponding to formula II include p-aminobenzoic acid, m-aminobenzoic acid, 4-(aminomethyl) benzoic acid, 4-(aminoethyl)benzoic acid, 3-(aminomethyl)benzoic acid, 3-(aminoethyl)benzoic acid, and mixtures thereof.

An example of another class of aminoacid suitable for use in the invention are aminocyclopentane carboxylic acids represented by the following formula:

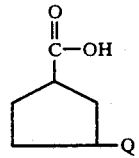

III wherein:
Q is $H_2N-$ or $H_2NR^3-$, and $R^3$ is methylene, ethylene, propylene or isopropylene.

Examples of compounds which correspond to formula III include 3-aminocyclopentanecarboxylic acid, 3-(aminomethyl) cyclopentane carboxylic acid, 3-(aminoethyl)cyclopentanecarboxylic acid, 3-(aminopencyl)cyclopentanecarboxylic acid, 3-(aminoisopropyl)cyclopentanecarboxylic acid, and mixtures thereof.

Examples of preferred salifying acids include aromatic sulfonic acids such as p-toluenesulfonic acid, naphthalenesulfonic acid, benzenesulfonic acid, 4-methylbenzenesulfonic acid, cycloalkylsulfonic acids such as cyclohexanesulfonic acid, and inorganic acids including hydrohalogen acids such as hydrobromic acid and hydrochloric acid, phosphoric acids such as metaphosphoric acid, and orthophosphoric acid, sulfuric acid, and mixtures thereof.

The molecular weight controllers of the present invention are particularly effective with polyamides containing some free reactive carboxylic acid groups. The term polyamide is intended to include all the linear chain polymers containing characteristic amide ($-NHCO$) groups. The preferred class of polyamides suitable for use in the present invention is represented by the following formula:

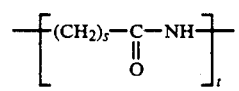

IV wherein:
s is a positive integer and has a value from 3 to 11 and t is a positive integer and represents the number of monomer units in the polymer required to achieve the desired molecular weight.

Examples of commercially important polyamides of this class include nylon 4, nylon 11, nylon 12 and, particularly, nylon 6 (s equals 5).

The preferred molecular weight of the polyamides produced using the molecular weight controllers of the present invention will generally be a number average molecular weight in the range of from about 10,000 to about 25,000 and, more preferably, will be a number average molecular weight of from about 16,000 to about 20,000.

Generally, the amount of molecular weight controller utilized for polymerization of the lactam will be an amount in the range of from about 30 equiv/$10^6$g to about 100 equiv/$10^6$g based on the weight of the polymer. More preferably, the amount will be an amount in the range of from about 35 to about 60 equiv/$10^6$g based on the weight of the polymer.

The amounts of monofunctional primary amine, monofunctional organic acid, and salified amino acid present in the molecular weight controller will vary over a wide range with no limitation. As a general rule, however, the molecular weight controller will comprise an aqueous composition containing from about 40.0 to about 60.0 mole percent monofunctional primary amine, about 15.0 to about 30.0 mole percent of monofunctional organic acid, and 20.0 to about 40.0 mole percent salified aminoacid based on the total moles of the three ingredients. More preferably, the aqueous molecular weight controller will contain about 48.0 to about 52.0 mole percent primary amine, about 18 to about 22 mole percent monofunctional organic acid, and about 28.0 to about 32.0 mole percent salified aminoacid based on the total moles of the three ingredients.

Procedures for polymerizing the lactam to form the polyamide are known to persons skilled in the art. Preferably, the polymerization reaction is carried out at a temperature in the range of from about 220° C. to about 280° C. The hydrolysis and polyaddition portion of the reaction is carried out at atmospheric pressure or, in other words, the normal pressure of the vessel used for this portion of the reaction and the polycondensation portion of the reaction is preferably carried out under a strong vacuum, 5mm of mercury or less. The time for the polymerization is generally 5 to about 20 hours.

Thereafter, the polyamide can be vacuum extracted and then extruded to form one or more fibers. The extruded fibers are then cooled and thereafter processed (drawn, crimped, etc.) in accordance with the final application of the fibers.

Although the molecular weight controller finds particular application in a continuous process, they can also be utilized in discontinuous polymerization procedures.

In addition to molecular weight controllers, other property-modifying ingredients can be incorporated into the polyamides in any desired amount. Examples of such additives include fire-retarding agents such as antimony, phosphorus, and halogen compounds; delustrants such as titanium dioxide; antistatic agents; heat and light stabilizers such as inorganic reducing ions; transition metal ions such as $Mn^{+2}$, $Cu^{+2}$, and $Sn^{+2}$; phosphites, organic amines such as alkylated aromatic amines and ketone aromatic amine condensates; thermally stable pigments; fluorescing agents and brighteners; bacteriostats such as phenols and quaternary amines; antisoiling agents and the like. These additives can be incorporated into the polymer at any stage of the reaction, whether as concentrates distributed in the monomer or in preformed polyamide. For operational efficiency, however, the additives are preferably introduced together with the molecular weight controllers at the commencement of the process. Proper dispersion of these ingredients within the polymer is achieved by means conventional in the art.

The invention is further exemplified by the example below which is presented to illustrate certain specific embodiments of the invention, but is not intended to be construed so as to be restrictive of the scope and spirit thereof.

EXAMPLE

Tables I and II set forth the abbreviations used in the Example.

TABLE I

| Abbreviation | Chemical |
| --- | --- |
| CL | caprolactam |
| BAM | benzylamine |
| HAC | acetic acid |
| A/S | 4-(aminomethyl)benzoic acid salified with p-toluenesulfonic acid |

TABLE II

| Abbreviation | Measurement |
| --- | --- |
| RV | relative viscosity |
| CD | cyclic dimer |
| AEC | terminal amino-group content |
| COOH | terminal carboxylic group content |
| MWC | molecular weight controller |
| CL | caprolactam monomer |

Relative viscosity, which is a measure for the molecular weight of the polymer, was determined using standard procedures wherein the concentration of the measuring solution is 10g/liter, the solvent is 96 percent by weight sulfuric acid, and the measuring temperature is 25° C.

Throughout the Example, all percentages are by weight, unless otherwise specified.

The terminal amino-group content and terminal carboxylic content of the poly(caprolactam) reported in the examples was determined using standard titration procedures. The poly(caprolactam) was dissolved in hot benzyl alcohol and the amine end groups were then titrated to the thymol blue end point with methanolic HCl. The carboxylic acid end points were titrated to the Cresol red end point with methanolic NaOH.

The determination of amounts of caprolactam monomer and cyclic dimer reported in the Example was determined by gas chromatography.

A series of tests was carried out introducing 339 parts by weight caprolactam and molecular weight controllers of the present invention into a sealed vessel. The mixtures were heated to 250° C. for a total period of 24 hours. Atmospheric pressure was maintained on the vessel during this time except during vacuum extraction. The vacuum extraction was carried out at a pressure of less than 1 mm of mercury. Next, the polycaprolactam was extruded and the impurities were extracted by means of hot water. Measurements of the impurities of the poly(caprolactam) were measured at the end of both of these steps. After the hot water extraction step, the polycaprolactam was dried to where it contained less than 500 ppm of water, introduced into a tube held under a static nitrogen blanket and heated at 260° C. for periods of 30, 60, and 90 minutes. After the heating, the polymer was removed from the tube and analyzed. The results of these tests are reported in Table III.

TABLE III

| TEST NO. | MWC (g) | EXTRUDED POLYMER ANALYSIS | | | | | ANALYSIS OF EXTRUDED, WASHED, AND DRIED POLYMER | | | | | |
| --- | --- | --- | --- | --- | --- | --- | --- | --- | --- | --- | --- | --- |
| | | RV | AEC | COOH | CL(%) | CD(%) | RV | AEC | COOH | CL(%) | CD(%) | H$_2$O(%) |
| 1 | BAM (1.83) HAC | 2.26 | 32 | 24 | 0.08 | 0.31 | 2.31 | 34 | 21 | 0.005 | 0.03 | 0.04 |

TABLE III-continued

| | | | | | | | | | | | | |
|---|---|---|---|---|---|---|---|---|---|---|---|---|
| | (0.78) H$_2$O (3.60) A/S (0.97) | | | | | | | | | | | |
| 2 | BAM (1.83) HAC (0.78) H$_2$O (3.60) A/S (0.97) | 2.26 | 32 | 24 | 0.08 | 0.31 | 2.31 | 34 | 21 | 0.005 | 0.03 | 0.04 |
| 3 | BAM (1.83) HAC (0.78) H$_2$O (3.60) A/S (0.97) | 2.33 | 32 | 20 | 0.06 | 0.19 | 2.35 | 31 | 18 | 0.01 | 0.07 | 0.038 |
| 4 | BAM (1.83) HAC (0.78) H$_2$O (3.67) A/S (0.95) | 2.35 | 33 | 21 | 0.06 | 0.29 | 2.33 | 34 | 20 | 0.009 | 0.044 | 0.018 |

| | | ANALYSIS OF POLYMER HEATED AT 260° C. | | | | | | | | | | | | | |
|---|---|---|---|---|---|---|---|---|---|---|---|---|---|---|---|
| | | 30 MINUTES | | | | | 60 MINUTES | | | | | 90 MINUTES | | | | |
| TEST NO. | MWC (g) | RV | AEC | COOH | CL (%) | CD (%) | RV | AEC | COOH | CL (%) | CD (%) | RV | AEC | COOH | CL (%) | CD (%) |
| 1 | BAM (1.83) HAC (0.78) H$_2$O (3.60) A/S (0.97) | 2.26 | 24 | 24 | 0.29 | 0.07 | 2.33 | 28 | 24 | 0.48 | 0.1 | 2.33 | 27 | 22 | 0.57 | 0.11 |
| 2 | BAM (1.83) HAC (0.78) H$_2$O (3.60) A/S (0.97) | 2.31 | 27 | 23 | 0.25 | 0.04 | 2.33 | 28 | 22 | 0.38 | 0.03 | 2.26 | 27 | 23 | 0.53 | 0.02 |
| 3 | BAM (1.83) HAC (0.78) H$_2$O (3.60) A/S (0.97) | 2.36 | 29 | 21 | 0.17 | 0.037 | 2.36 | 30 | 21 | 0.23 | 0.041 | 2.38 | 28 | 20 | 0.66 | 0.055 |
| 4 | BAM (1.83) HAC (0.78) H$_2$O (3.67) A/S (0.95) | 2.34 | 31 | 22 | 0.07 | 0.058 | 2.34 | 32 | 21 | 0.21 | 0.058 | 2.35 | 30 | 20 | 0.46 | 0.061 |

The results of the tests demonstrate the effectiveness of the molecular weight controllers of the present invention in reducing monomer and cyclic dimer content of the resulting poly(epsiloncaprolactam). Even after heating the polycaprolactam at 260° C. for a period of 90 minutes, the reformation of monomers and cyclic dimer was very low.

Although certain preferred embodiments of the invention have been described for illustrative purposes, it will be appreciated that various modifications and innovations of the procedures and compositions recited herein may be effected without departure from the basic principles which underlie the invention. Changes of this type are therefore deemed to lie within the spirit and scope of the invention except as may be necessarily limited by the amended claims or reasonable equivalents thereof.

What is claimed is:

1. A process of polymerizing lactams to produce a polyamide having recurring units of the formula

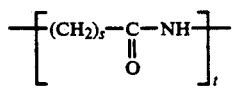

wherein
s is a positive integer and has a value from 3 to 11; and
t is a positive integer and represents the number of monomer units in the polymer required to achieve the desired molecular weight;

comprising:
adding to said lactams an effective amount of an aqueous molecular weight controller comprising
(a) a monofunctional primary amine having a boiling point of at least 180° C. at atmospheric pressure and a basic dissociation constant of at least $1.7 \times 10^{-5}$;
(b) a monofunctional organic acid having an acid dissociation constant of at least $1.5 \times 10^{-5}$; and,
(c) an aminoacid containing a cyclic structure of 5 or 6 carbon atoms, a total number of carbon atoms in the range of from about 6 to 9, and having its amino group salified by a salifying monofunctional acid having an acid dissociation constant of at least $1.0 \times 10^{-2}$ wherein the polymerization is carried out at a temperature in the range of from about 200 to 280° C.

2. The process recited in claim 1 wherein said process is continuous.

3. The process recited in claim 2 wherein said aminoacid is selected from the group consisting of

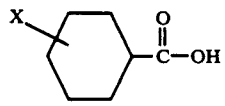

wherein:
X is $H_2N$—or $NH_2R^1$—, $R^1$ is methylene or ethylene, and X occupies one of the two 3 positions or the 4 position with respect to the carboxylic moiety;

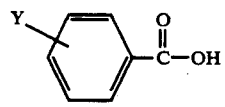

wherein:
Y is $H_2N$—or $NH_2R^2$—, $R^2$ is methylene or ethylene, and Y occupies the para position or on of the two meta positions with respect to the carboxylic acid moiety;

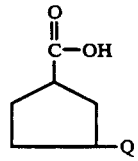

wherein:
Q is $H_2N$—or $H_2NR^3$—and $R^3$ is methylene, ethylene, propylene or isopropylene: and, mixtures thereof.

4. The process recited in claim 3 wherein said salifying acid is selected from the group consisting of p-toluenesulfonic acid, naphthalenesulfonic acid, benzenesulfonic acid, 4-methylbenzene sulfonic acid, cyclohexanesulfonic acid, acetic acid, hydrochloric acid, metaphosphoric acid, orthophosphoric acid, sulfuric acid, and mixtures thereof.

5. The process recited in claim 4 wherein said monofunctional primary amine is selected from the group consisting of nonylamine, decylamine, dodecylamine, α-phenylethylamine, β-phenylethylamine, benzylamine, and mixtures thereof.

6. The process recited in claim 5 wherein said monofunctional organic acid is selected from the group consisting of acetic acid, propionic acid, n-butyric acid, isoburyric acid, n-valeric acid, trimethylacetic acid, caproic acid, pelargonic acid, benzoic acid, napthionic acid, and mixtures thereof.

7. The process recited in claim 6 wherein said polyamide is selected from the group consisting of nylon 4, nylon 6, nylon 11, nylon 12, and mixtures thereof.

8. The process recited in claim 7 wherein said polyamide has a number average molecular weight in the range of from about 10,000 to about 25,000.

9. The process recited in claim 8 wherein said aminoacid is selected from the group consisting of trans-1,4-aminocyclohexanecarboxylic acid, cis-1,4-aminocyclohexanecarboxylic acid, trans-1,3-aminocyclohexanecarboxylic acid, cis-1,3-aminocyclohexanecarboxylic acid, cis-1(aminomethyl)-3-cyclohexanecarboxylic acid, trans-1(aminomethyl)-3-cyclohexane-carboxylic acid, cis-1(amino-ethyl)-3-cyclohexanecarboxylic acid, trans-1(aminoethyl-3-cyclohexanecarboxylic acid, cis-1(aminomethyl)-4-cyclohexanecarboxylic acid, trans-1(aminomethyl)-4-cyclohexanecarboxylic acid, cis-1(aminoethyl)-4-cyclohexanecarboxylic acid, trans-1(aminoethyl)-4-cyclohexanecarboxylic acid, p-aminobenzoic acid, m-aminobenzoic acid, 4-(aminomethyl)benzoic acid, 4-(aminoethyl)-benzoic acid, 3-(aminomethyl)benzoic acid, 3-(aminoethyl)benzoic acid, and mixtures thereof.

10. The process recited in claim 9 wherein said monofunctional primary amine is present in an amount in the range of from about 40.0 to about 60.0 mole percent based on the total moles of said monofunctional primary amine, said monofunctional organic acid, and said salified aminoacid.

11. The process recited in claim 10 wherein said monofunctional organic acid is present in an amount in the range of from about 15.0 to about 30.0 mole percent based on the total moles of said monofunctional primary amine, said monofunctional organic acid, and said salified aminoacid.

12. The process recited in claim 11 wherein said salified aminoacid is present in an amount in the range of from about 20.0 to about 40.0 mole percent based on the total moles of said monofunctional primary amine, said monofunctional organic acid, and said salified aminoacid.

13. The process recited in claim 12 wherein said monofunctional primary amine is benzylamine, said monofunctional organic acid is acetic acid, and said salified aminoacid is 4-(aminomethyl)cyclo-hexanecarboxylic acid salified with p-toluenesulfonic acid or 4-(aminomethyl)benzoic acid salified with p-toluenesulfonic acid.

14. The process recited in claim 13 wherein said molecular weight controller is present in an amount in the range of from about 35 equiv/$10^6$g to about 60 equiv/$10^6$g.

15. A yarn prepared from a polyamide produced by the process of claim 13.

* * * * *